US012574853B2

(12) United States Patent
Kaikkonen et al.

(10) Patent No.: US 12,574,853 B2
(45) Date of Patent: Mar. 10, 2026

(54) SCELL PREPARATION

(71) Applicant: Nokia Technologies Oy, Espoo (FI)

(72) Inventors: Jorma Johannes Kaikkonen, Oulu (FI); Knud Knudsen, Aalborg (DK); Jan Torst Hviid, Aalborg (DK); Tapio Ilmari Nousiainen, Oulu (FI); Pasi Eino Tapio Kinnunen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 307 days.

(21) Appl. No.: 18/358,632

(22) Filed: Jul. 25, 2023

(65) Prior Publication Data

US 2024/0121716 A1 Apr. 11, 2024

(30) Foreign Application Priority Data

Sep. 30, 2022 (FI) ...................................... 20225882

(51) Int. Cl.
*H04W 52/02* (2009.01)
*H04W 48/20* (2009.01)
*H04W 76/10* (2018.01)

(52) U.S. Cl.
CPC ....... *H04W 52/0235* (2013.01); *H04W 48/20* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 2014/0064170 A1* | 3/2014 | Seo ................... | H04W 52/0235 |
| | | | 370/311 |
| 2017/0086172 A1 | 3/2017 | Dinan | |
| 2019/0230590 A1 | 7/2019 | Wu et al. | |
| 2019/0254110 A1* | 8/2019 | He ......................... | H04W 76/28 |
| 2020/0029256 A1* | 1/2020 | Rico Alvarino .. | H04W 72/0453 |
| 2020/0029302 A1* | 1/2020 | Cox ................... | H04W 52/0216 |
| 2020/0112919 A1* | 4/2020 | Nam ................. | H04W 52/0229 |
| 2021/0219230 A1 | 7/2021 | Zhang et al. | |
| 2021/0329591 A1* | 10/2021 | Hwang ................ | H04L 5/0051 |
| 2023/0068265 A1* | 3/2023 | Venkataraman .. | H04W 52/0229 |

FOREIGN PATENT DOCUMENTS

| | | |
|---|---|---|
| WO | 2019/096888 A1 | 5/2019 |
| WO | 2022/000246 A1 | 1/2022 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

(Continued)

*Primary Examiner* — Jamaal Henson
(74) *Attorney, Agent, or Firm* — McCarter & English LLP

(57) ABSTRACT

Various example embodiments relate to secondary cell (SCell) preparation. An apparatus may receive, from a base station, a wake-up signal for activating means, of the apparatus, for bidirectional communication and determine, based on the wake-up signal, at least one candidate cell or carrier for a secondary cell for communication between the means for bidirectional communication and the base station. Apparatuses and methods are disclosed.

20 Claims, 4 Drawing Sheets

(56)            References Cited

OTHER PUBLICATIONS

"3rd Generation Partnership Project; Technical Specification Group Radio Access Network; NR; Medium Access Control (MAC) protocol specification (Release 17)", 3GPP TS 38.321, V17.1.0, Jun. 2022, pp. 1-241.

"3rd Generation Partnership Project; Technical Specification Group Radio Access Network; Study on support of reduced capability NR devices (Release 17)", 3GPP TR 38.875, V17.0.0, Mar. 2021, pp. 1-135.

"New SID: Study on low-power Wake-up Signal and Receiver for NR", 3GPP TSG RAN meeting #94e, RP-213645, Agenda: 8A.1, vivo, Dec. 6-17, 2021, 4 pages,.

"Motivation for new study item on ultra-low power wake up signal in Rel-18", 3GPP TSG RAN Rel-18 workshop, RWS-210168, Agenda: 4.3, vivo, Jun. 28-Jul. 2, 2021, 13 pages.

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—Amendment 3: Wake-Up Radio Operation", IEEE Computer Society, IEEE Std 802.11ba TM-2021, Oct. 8, 2021, 180 pages.

"IEEE 802.11a", Wikipedia, Retrieved on Aug. 22, 2023, Webpage available at : https://en.wikipedia.org/wiki/IEEE_802.11a-1999.

"IEEE 802.11g", Wikipedia, Retrieved on Aug. 22, 2023, Webpage available at : https://en.wikipedia.org/wiki/IEEE_802.11g-2003.

"IEEE 802.11n", Wikipedia, Retrieved on Aug. 22, 2023, Webpage available at : https://en.wikipedia.org/wiki/IEEE_802.11n-2009.

"IEEE 802.11ac", Wikipedia, Retrieved on Aug. 22, 2023, Webpage available at : https://en.wikipedia.org/wiki/IEEE_802.11ac-2013.

"IEEE 802.11", Wikipedia, Retrieved on Aug. 1, 2023, Webpage available at : https://en.wikipedia.org/wiki/IEEE_802.11.

"Msc-generator", Sourceforge, Retrieved on Aug. 17, 2023, Webpage available at : https://sourceforge.net/projects/msc-generator/.

"3rd Generation Partnership Project; Technical Specification Group Radio Access Network; NR; Physical channels and modulation (Release 17)", 3GPP TS 38.211, V17.2.0, Jun. 2022, pp. 1-136.

"3rd Generation Partnership Project; Technical Specification Group Radio Access Network; NR; Physical layer procedures for control (Release 17)", 3GPP TS 38.213, V17.2.0, Jun. 2022, pp. 1-256.

Office action received for corresponding Finnish Patent Application No. 20225882, dated Feb. 23, 2023, 12 pages.

"UE adaptation to the traffic for UE power saving", 3GPP TSG RAN WG1 Meeting #94bis, R1-1810976, Agenda: 7.2.9.2.1, Oppo, Oct. 8-12, 2018, 8 pages.

Extended European Search Report received for corresponding European Patent Application No. 23186564.3, dated Feb. 19, 2024, 9 pages.

* cited by examiner

100

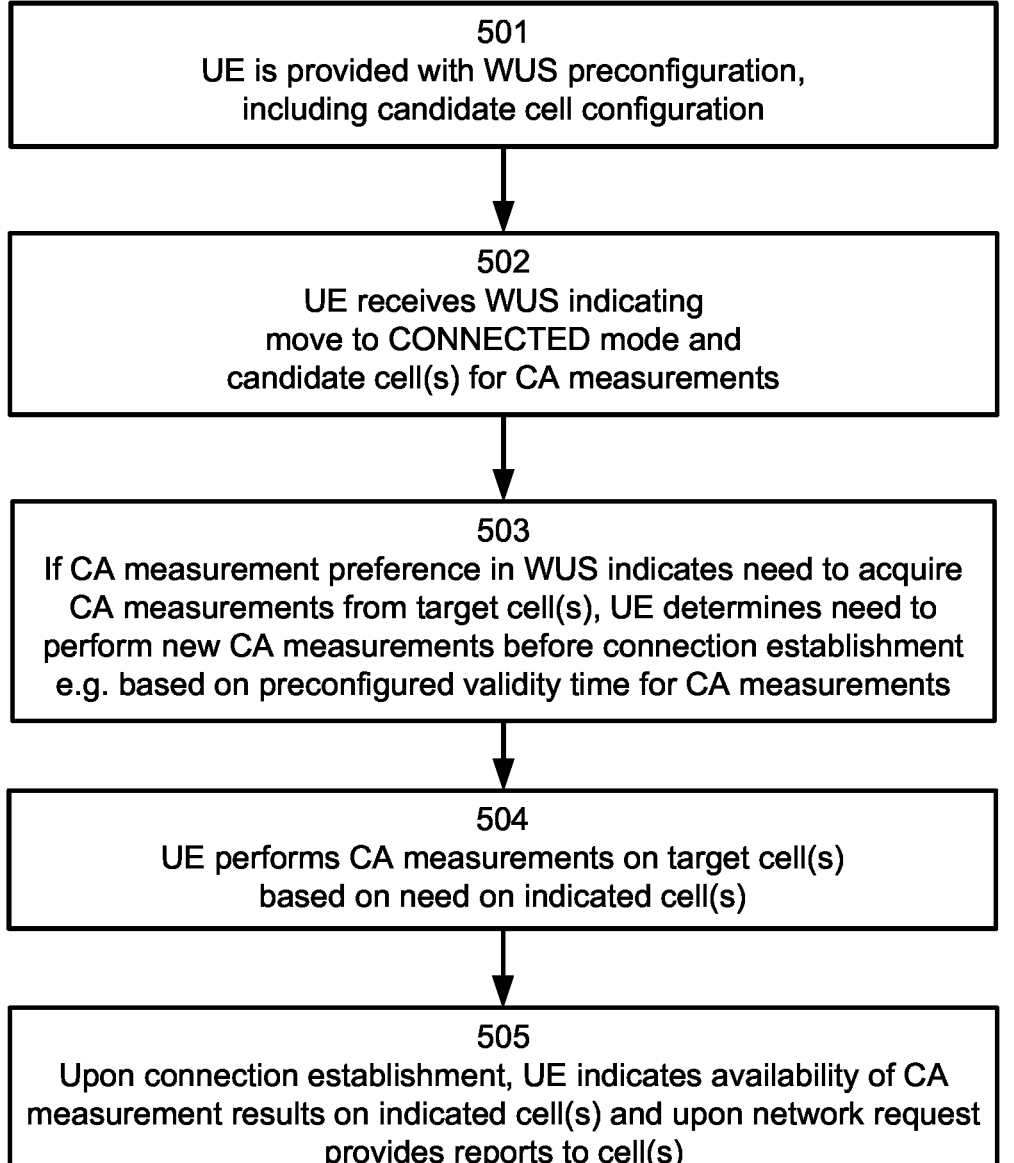

501
UE is provided with WUS preconfiguration,
including candidate cell configuration

502
UE receives WUS indicating
move to CONNECTED mode and
candidate cell(s) for CA measurements

503
If CA measurement preference in WUS indicates need to acquire
CA measurements from target cell(s), UE determines need to
perform new CA measurements before connection establishment
e.g. based on preconfigured validity time for CA measurements

504
UE performs CA measurements on target cell(s)
based on need on indicated cell(s)

505
Upon connection establishment, UE indicates availability of CA
measurement results on indicated cell(s) and upon network request
provides reports to cell(s)

FIG. 5

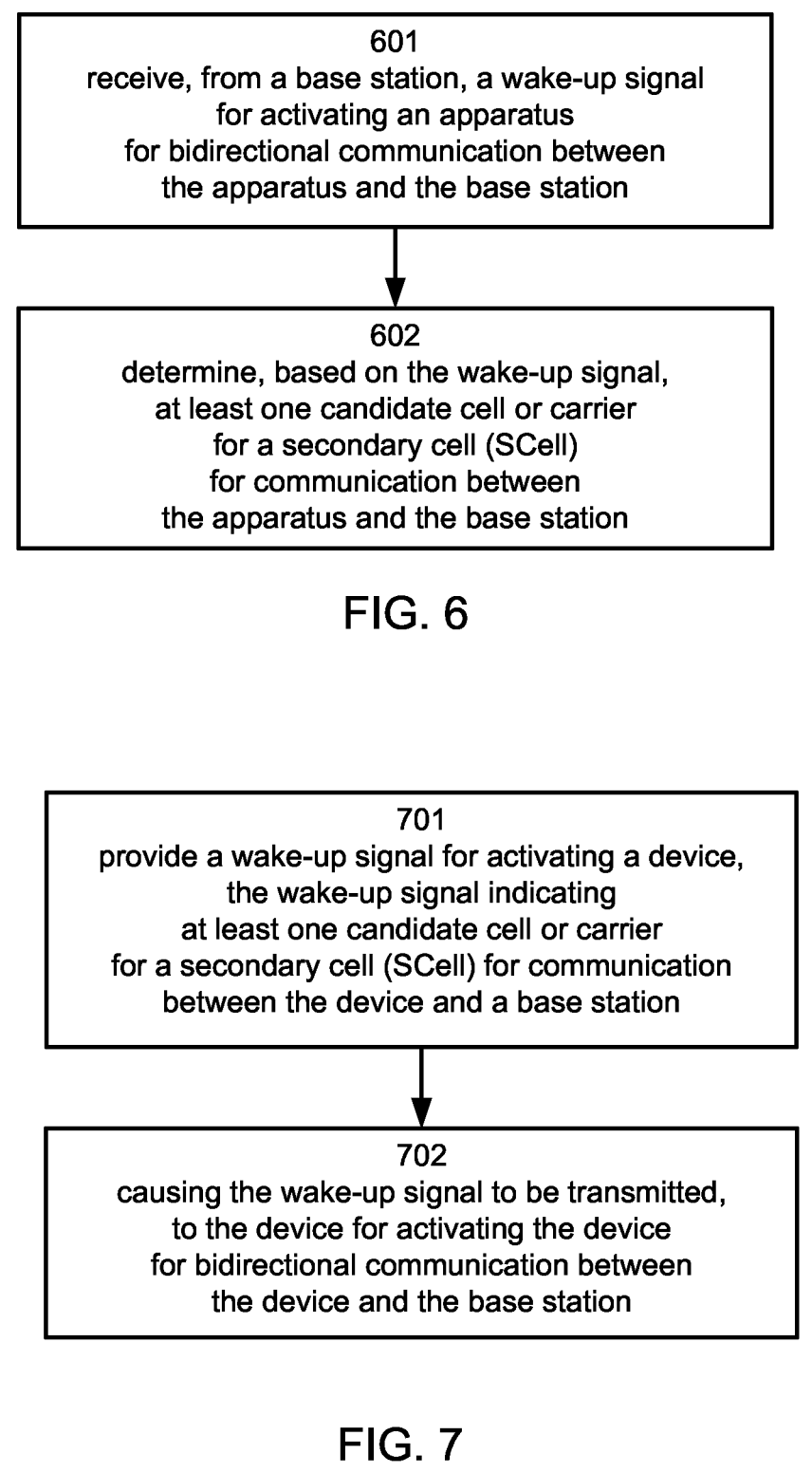

601
receive, from a base station, a wake-up signal
for activating an apparatus
for bidirectional communication between
the apparatus and the base station 602
determine, based on the wake-up signal,
at least one candidate cell or carrier
for a secondary cell (SCell)
for communication between
the apparatus and the base station

FIG. 6

701
provide a wake-up signal for activating a device,
the wake-up signal indicating
at least one candidate cell or carrier
for a secondary cell (SCell) for communication
between the device and a base station 702
causing the wake-up signal to be transmitted,
to the device for activating the device
for bidirectional communication between
the device and the base station

FIG. 7

SCELL PREPARATION

RELATED APPLICATION

This application claims priority to FI Application No. 20225882 filed Sep. 20, 2022, which is incorporated herein by reference in its entirety.

TECHNICAL FIELD

Various example embodiments generally relate to the field of wireless communications. Some example embodiments relate to secondary cell preparation for a device for communicating with a network.

BACKGROUND

In various wireless communication systems, for example the 3GPP 5G New Radio (NR), it may be desired to improve power saving for user equipment (UE). The UE may be in various states with respect to the network, for example to enable power saving in absence of any data communication between the UE and the network. An example of such state is an inactive state, which enables power saving with a possibility for quickly resuming the connection to the network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. The scope of protection sought for various embodiments of the present disclosure is set out by the independent claims.

Example embodiments of the present disclosure enable secondary cell (SCell) preparation for a device for communication with a network before or during activation of the device for communication with the network. This and other benefits may be achieved by the features of the independent claims. Further advantageous implementation forms are provided in the dependent claims, the description, and the drawings. The device may be an apparatus according to the first or the sixth aspect or any of their example embodiments, described as follows.

According to a first aspect, an apparatus may comprise means for receiving, from a base station, a wake-up signal for activating means, of the apparatus, for bidirectional communication between the apparatus and the base station. The apparatus may also comprise means for determining, based on the wake-up signal, at least one candidate cell for a secondary cell (SCell) for communication between the means for bidirectional communication and the base station.

According to an example embodiment of the first aspect, the apparatus may further comprise means for a measurement of the at least one candidate cell before or during or (before and during) connection establishment between the means for bidirectional communication and the base station. The apparatus may be a user equipment (UE).

According to an example embodiment of the first aspect, the apparatus may further be configured for causing at least one indication of a result of the measurement to be transmitted to the base station upon the connection establishment between the means for bidirectional communication and the base station.

According to an example embodiment of the first aspect, the apparatus may be configured for receiving, from the base station, an indication of a delay and, based on the indication of the delay, delaying the connection establishment between the means for bidirectional communication and the base station for the measurement.

According to an example embodiment of the first aspect, the apparatus may further comprise means for receiving, from the base station in a connection release, a preconfiguration for determining the at least one candidate cell, wherein the means for determining the at least one candidate cell are configured for using the preconfiguration for the determining of the at least one candidate cell when the wake-up signal has been received.

According to an example embodiment of the first aspect, the activating the means for bidirectional communication may comprise at least one of the following: monitoring of a downlink channel or, monitoring of a downlink signal or, causing an uplink channel to be transmitted or causing an uplink signal to be transmitted.

According to a second aspect, an apparatus may comprise means for providing a wake-up signal for activating a device, the wake-up signal indicating at least one candidate cell for a secondary cell (SCell) for communication between the device and the apparatus. The apparatus may also comprise means for causing the wake-up signal to be transmitted to the device for activating the device for bidirectional communication between the device and the apparatus. The device may be an apparatus according to the first or the sixth aspect or any of their example embodiments. The apparatus may be a base station.

According to an example embodiment of the second aspect, the apparatus may be configured for receiving at least one indication of a result of a measurement of the at least one candidate cell from the device upon connection establishment between the device and the apparatus.

According to an example embodiment of the second aspect, the apparatus may be configured for causing an indication of a delay to be transmitted, to the device, for delaying connection establishment between the device and the apparatus for the measurement.

According to an example embodiment of the second aspect, the apparatus may be configured for providing, in a connection release, a preconfiguration for determining the at least one candidate cell at the device when the wake-up signal has been received at the device and for causing the preconfiguration be transmitted to the device in a connection release between the device and the apparatus.

According to an example embodiment of the second aspect, the apparatus may be configured for requesting, from the device, at least one result of a measurement upon connection establishment between the device and the apparatus.

According to an example embodiment of the second aspect, the activating the device may comprise at least one of the following: monitoring of a downlink channel or, monitoring of a downlink signal or, causing an uplink channel to be transmitted or causing an uplink signal to be transmitted.

According to a third aspect, a method may comprise receiving, from a base station, a wake-up signal for activating an apparatus for bidirectional communication between the apparatus and the base station. The method may also comprise determining, based on the wake-up signal, at least one candidate cell for a secondary cell (SCell) for communication between the apparatus and the base station. The apparatus may be an apparatus according to the first or the sixth aspect or any of their example embodiments.

According to an example embodiment of the third aspect, the method may further comprise performing at least one measurement of the at least one candidate cell before or during or (before and during) connection establishment between the apparatus and the base station.

According to an example embodiment of the third aspect, the method may further comprise causing at least one indication of a result of the at least one measurement to be transmitted to the base station upon the connection establishment between the apparatus and the base station.

According to an example embodiment of the third aspect, the method may comprise receiving, from the base station, an indication of a delay and, based on the indication of the delay, delaying the connection establishment between the apparatus and the base station for the at least one measurement.

According to an example embodiment of the third aspect, the method may further comprise receiving, from the base station in a connection release, a preconfiguration for determining the at least one candidate cell, wherein the at least one candidate cell is determined using the preconfiguration for determining the at least one candidate cell when the wake-up signal has been received.

According to an example embodiment of the third aspect, the activating the means for bidirectional communication may comprise at least one of the following: monitoring of a downlink channel or, monitoring of a downlink signal or, causing an uplink channel to be transmitted or causing an uplink signal to be transmitted.

According to a fourth aspect, a method may comprise providing a wake-up signal for activating a device, the wake-up signal indicating at least one candidate cell for a secondary cell (SCell) for communication between the device and a base station; and causing the wake-up signal to be transmitted to the device for activating the apparatus for bidirectional communication between the apparatus and the base station. The device may be an apparatus according to the first or the sixth aspect or any of their example embodiments. The fourth aspect may be performed by a base station.

According to an example embodiment of the fourth aspect, the method may comprise receiving at least one indication of a result of a measurement of the at least one candidate cell from the apparatus upon connection establishment between the apparatus and the base station.

According to an example embodiment of the fourth aspect, the method may comprise causing an indication of a delay to be transmitted, to the apparatus, for delaying connection establishment between the apparatus and the base station for the measurement.

According to an example embodiment of the fourth aspect, the method may comprise providing, in a connection release, a preconfiguration for determining the at least one candidate cell at the apparatus when the wake-up signal has been received at the apparatus. The method may also comprise causing the preconfiguration to be transmitted to the apparatus in a connection release between the apparatus and the base station.

According to an example embodiment of the fourth aspect, the method may comprise requesting, from the apparatus, at least one result of a measurement upon connection establishment between the apparatus and the base station.

According to an example embodiment of the fourth aspect, the activating the device may comprise at least one of the following: monitoring of a downlink channel or, monitoring of a downlink signal or, causing an uplink channel to be transmitted or causing an uplink signal to be transmitted.

According to a fifth aspect, a computer program may comprise instructions which, when executed by an apparatus, cause the apparatus to perform at least the following: receiving, from a base station, a wake-up signal for activating the apparatus for bidirectional communication between the apparatus and the base station; and determining, based on the wake-up signal, at least one candidate cell for a secondary cell (SCell) for communication between the apparatus and the base station. The computer program may further comprise instructions for causing the apparatus to perform any example embodiment of the method of the third aspect. The apparatus may be an apparatus according to the first or the sixth aspect or any of their example embodiments.

According to a sixth aspect, an apparatus may comprise at least one processor and at least one memory storing instructions that, when executed by the at least one processor, cause the apparatus at least to perform: receiving, from a base station, a wake-up signal for activating the apparatus for bidirectional communication between the apparatus and the base station; and determining, based on the wake-up signal, at least one candidate cell for a secondary cell (SCell) for communication between the apparatus and the base station. The at least one memory may further store instructions that, when executed by the at least one processor, cause the apparatus to perform any example embodiment of the method of the third aspect. The apparatus may be an apparatus according to the first aspect or any of its example embodiments.

According to a seventh aspect, a computer program may comprise instructions which, when executed by an apparatus, cause the apparatus to perform at least the following: providing a wake-up signal for activating a device, the wake-up signal indicating at least one candidate cell for a secondary cell (SCell) for communication between the device and the apparatus; and transmitting the wake-up signal to the device for activating the device for bidirectional communication between the device and the apparatus. The computer program may further comprise instructions for causing the apparatus to perform any example embodiment of the method of the fourth aspect. The apparatus may be an apparatus according to the second or the eight aspect or any of their example embodiments. The apparatus may be a base station. The device may be an apparatus according to the first or the sixth aspect or any of their example embodiments.

According to an eight aspect, an apparatus may comprise at least one processor and at least one memory storing instructions that, when executed by the at least one processor, cause the apparatus at least to perform: providing a wake-up signal for activating a device, the wake-up signal indicating at least one candidate cell for a secondary cell (SCell) for communication between the device and the apparatus; and transmitting the wake-up signal to the device for activating the device for bidirectional communication between the device and the apparatus. The at least one memory may further store instructions that, when executed by the at least one processor, cause the apparatus to perform any example embodiment of the method of the fourth aspect. The apparatus may be an apparatus according to the second aspect or any of its example embodiments. The apparatus may be a base station. The device may be an apparatus according to the first or the sixth aspect or any of their example embodiments.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 5 illustrates an example of a flow chart for SCell preparation, according to an example embodiment;

FIG. 6 illustrates an example of a method at a UE, according to an example embodiment; and FIG. 7 illustrates an example of a method at a base station, according to an example embodiment.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Secondary SCell preparation, as disclosed herein, may be desired for enhancements for user equipment (UE) energy savings, for example in 5G NR, 5G-advanced NR and in 6G. Energy savings may be particularly provided for devices, such as UEs, which have extended battery lifetime targets, such as weeks or even years. This includes devices without a continuous energy source, e.g., UEs using small rechargeable and non-rechargeable single coin cell batteries, such as those used for vertical use cases (including sensors and actuators that are deployed extensively for monitoring, measuring, charging, etc.). Generally, their batteries may not be rechargeable but may be expected to last at least few years as described, for example, in TR 38.875. The apparatuses and devices, such as UEs, described herein may include any type of a mobile device with a radio frequency communication functionality, such as mobile phones, sensors or actuators but also wearables such as smart watches, rings, eHealth-related devices and medical monitoring devices. Without energy savings as described herein, many such devices may be challenging to sustain up to 1-2 weeks with typical battery capacity.

Some of the apparatuses and devices named above not only benefit from a long battery life but may also require latency-critical services. An example is a sensor, for example for fire detection and extinguishing. Therefore, solutions such as eDRX (allowing to extend the periodicity by which the UE wakes up to monitor for paging, which in turn reduces the average power consumption) may not necessarily be applicable as they could lead to unacceptable communication latency.

Figure 1:
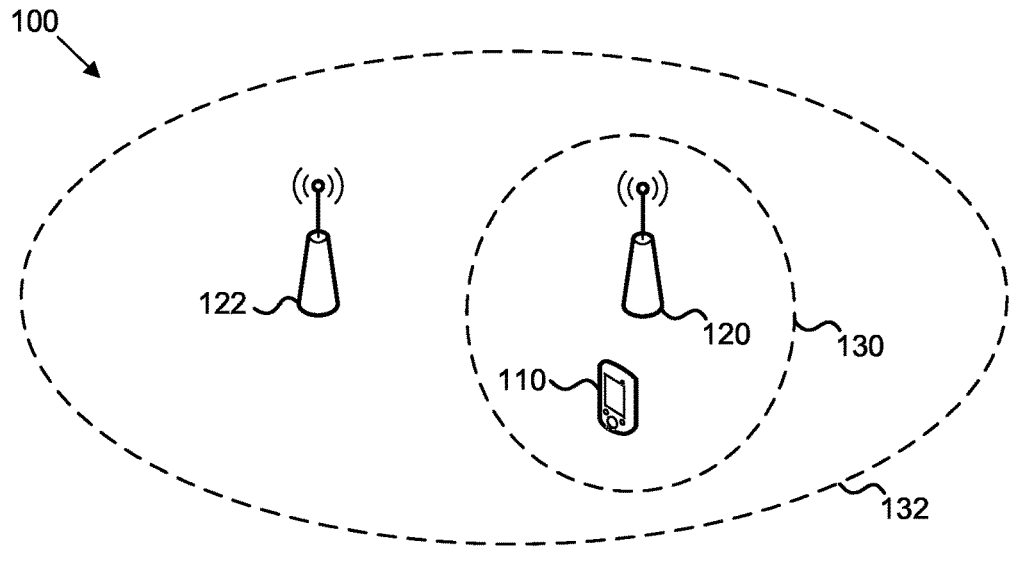
FIG. 1 illustrates an example of a communication network, according to an example embodiment.

FIG. 1 illustrates an example of a communication network, which may simply be referred to as "network", according to an example embodiment. The network 100 may comprise one or more core network elements such as for example access and mobility management function (AMF) and/or user Plane function (UPF), The network may comprise one or more base stations, for example 5th generation base stations (gNB) 120, 122. The network 100 may further comprise one or more devices, which may be also referred to as a user nodes or user equipment (UE). For example, the communication network 100 may comprise a UE 110. The UE 110 may communicate with one or more of the base stations via wireless radio channel(s). Communications between UE 110 and base station(s) may be bidirectional. Hence, any of these devices may be configured to operate as a transmitter and/or a receiver. The UE may comprise or consist of any of the devices described above. In particular, the UE may be configured for an extended battery lifetime, such as a lifetime of one week or more or even one year or more.

The base station(s) may be configured to communicate with the core network elements over a communication interface. Base station(s) may be also called radio access network (RAN) nodes and they may be part of a radio access network between the core network and the UE 110. Functionality of a base station may be distributed between a central unit (CU), for example a gNB-CU, and one or more distributed units (DU), for example gNB-DUs. Network elements such as gNB, gNB-CU, and gNB-DU may be generally referred to as network nodes or network devices. Although depicted as a single device, a network node may be, for example, a distributed computing system coupled to a remote radio head.

The communication network 100 may be configured for example in accordance with the 5th Generation digital cellular communication network, as defined by the 3rd Generation Partnership Project (3GPP). In one example, the communication network 100 may operate according to 3GPP 5G NR (5G New Radio). It is however appreciated that example embodiments presented herein are not limited to this example network and may be applied in any present or future wireless or wired communication networks, or combinations thereof, for example other type of cellular networks, short-range wireless networks, multicast networks, or the like.

The network 100 and any of UEs 110 and base stations 120, 122 therein may be configured for carrier aggregation (CA). This allows concurrently using radio resources across two or more carriers. An aggregated carrier may be referred as a component carrier. The (component) carriers may correspond to cells, such as a primary cell 130 (PCell) and a secondary cell (SCell). The primary cell may be used for initial access between the UE and the base station. Serving cells for communication between the UE and the base station may include a primary cell and at least one secondary cell but there may also be a plurality of serving secondary cells.

In accordance with the present disclosure, a wake-up signal (WUS), such as a Low-power Wake-Up Signal (LP-WUS, e.g. 3GPP Rel-18 study item RP-213645), may be utilized for UE power saving. This may be utilized for any of the above-mentioned device types. The apparatus/device, in particular the UE, as described herein, may have separate means for bidirectional communication between the apparatus/device and a base station and for receiving the WUS. The means for receiving the WUS, e.g. a wake-up receiver (WUR), may thus be configured for waking up the means for bidirectional communication for the bidirectional communication between the apparatus/device and a base station.

Figure 2:
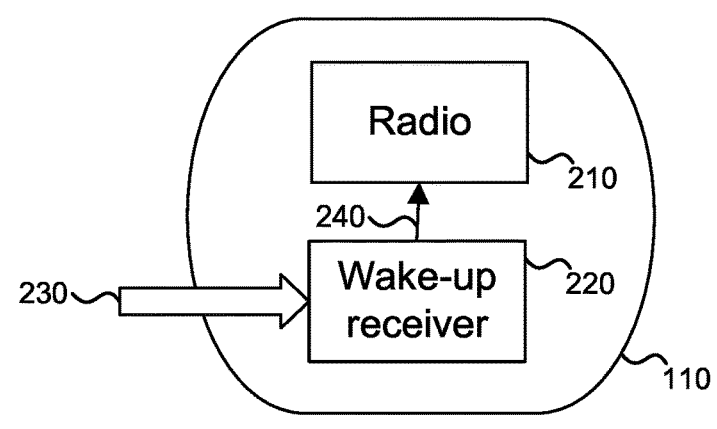
FIG. 2 illustrates an example of wake-up signal reception, according to an example embodiment.

FIG. 2 illustrates an example of wake-up signal (WUS) reception. The UE 110 comprises means 210 for bidirectional communication between a base station and the UE. The means for bidirectional communication may be a transceiver or any system comprising a transmitter and a receiver, separately or integrated together. The means for bidirectional communication may comprise or consist of at least one radio-frequency transmitter-receiver. The means for bidirectional communication may be the main radio of the UE. In addition, the UE comprises a wake-up receiver 220, which may be a low-power wake-up receiver. The wake-up receiver 220 may be separate from the main radio of the UE or the wake-up receiver may be fully integrated into the main radio or the wake-up receiver might be partly integrated into the main radio (e.g. there may be some shared elements between the wake-up receiver and the main radio such as RF elements). The means for bidirectional communication may be configured for operation in an inactive mode (e.g. RRC_INACTIVE) and/or idle mode (e.g. RRC_IDLE) for reduced power consumption. The inactive mode of the means for bidirectional communication may correspond to a sleep mode or even a deep sleep mode or a state where the means for bidirectional communication is powered off, allowing power saving when communication between the means for bidirectional communication and the base station is not ongoing while the wake-up receiver may be in an active mode. The means for bidirectional communication may be activated upon reception of a wake-up signal from the network, e.g. from the base station. The network may thus trigger the UE, and the means for bidirectional communication in particular, to wake-up exactly when needed. This may be performed in an event-driven manner.

In the inactive state, the UE 110 may stay registered to the network, but the connection to the network, such as the radio access network, e.g. to the base station 120, may be suspended. However, the radio access network may store the UE context, which enables the connection to be quickly resumed. The connection to the core network may be maintained. Even though some example embodiments have been described using the RRC_IDLE, RRC_INACTIVE, or RRC_CONNECTED states of the 5G system as examples, it is appreciated the example embodiments may be applied to other type of idle, inactive, or connected states, for example having similar characteristics as the RRC_IDLE, RRC_INACTIVE, or the RRC_CONNECTED states. A state, such as an RRC state, may be also referred to as a mode, such as an RRC mode.

The activation may thus be performed by transmitting a WUS 230 to the UE 110, for example from a base station 120. The receipt of the WUS may be monitored by a dedicated WUS receiver 220 at the UE. When the UE receives the WUS, the WUS receiver can trigger 240 the wake-up of the means for bidirectional communication 210, thus activating the means for bidirectional communication, and communication can start. Thus, the WUS receiver wakes up the means for bidirectional communication and otherwise, the means for bidirectional communication can remain inactive. The WUS receiver may be operated in an always 'on' manner with low power consumption or the WUS receiver may be operated in a discontinuous reception (DRX) manner and deactivated during DRX sleep periods. It may consume significantly less power compared to the means for bidirectional communication. This may be facilitated by designing a simple (WUS) signal and by the use of dedicated hardware for its monitoring. The sole purpose of the WUS receiver may thus be to receive the WUS and, based on the WUS, activate the means for bidirectional communication. The WUS receiver may also be referred to as a wake-up receiver (WUR).

Figure 3:
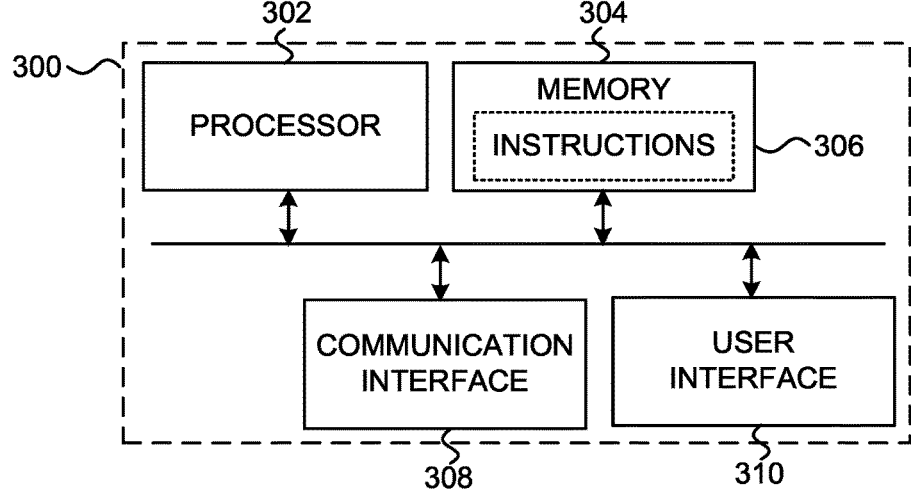
FIG. 3 illustrates an example of an apparatus configured to practice one or more example embodiments.

FIG. 3 illustrates an example embodiment of an apparatus 300, for example the UE 110, the base station 120, 122, or any network device.

The apparatus 300 may comprise at least one processor 302. The at least one processor 302 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware (HW) accelerator, a special-purpose computer chip, or the like.

The apparatus 300 may further comprise at least one memory 304. The at least one memory 304 may be configured to store, for example, instruction such as computer program code or the like, for example operating system software and application software. The at least one memory 304 may comprise one or more volatile memory devices, one or more non-volatile memory devices, and/or a combination thereof. For example, the at least one memory 304 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 300 may further comprise a communication interface 308 configured to enable apparatus 300 to transmit and/or receive information to/from other devices. The communication interface may be configured to provide at least one wireless radio connection, such as for example a 3GPP mobile broadband connection (e.g. 3G, 4G, 5G, 6G, . . . ). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 308 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas. The communication interface may include means for bidirectional communication between a base station and a device, such as UE, where the apparatus may be either the base station or the UE. The communication interface may include the WUS receiver 220, in particular when the apparatus is a UE 110.

The apparatus 300 may further comprise a user interface 310 comprising an input device and/or an output device. The input device may take various forms such a keyboard, a touch screen, or one or more embedded control buttons. The output device may for example comprise a display, a speaker, a vibration motor, or the like.

When the apparatus 300 is configured to implement some functionality, some component and/or components of the apparatus 300, such as for example the at least one processor 302 and/or the at least one memory 304, may be configured to implement this functionality. Furthermore, when the at least one processor 302 is configured to implement some functionality, this functionality may be implemented using instructions 306, for example program code, comprised, for example, in the at least one memory 304.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 300 comprises means for performing at least one example embodiment described herein. In one example, the means comprises the at least one processor 302, the at least one memory 304 storing instructions 306 that, when executed by the at least one processor, cause the apparatus 300 to perform the example embodiment(s).

The apparatus 300 may comprise for example a computing device such as for example a base station, a server, a network device, a mobile phone, a tablet computer, a laptop, an internet of things (IoT) device, or the like. Examples of IoT devices include, but are not limited to, consumer electronics, wearables, sensors, and smart home appliances. In one example, the apparatus 300 may comprise a vehicle such as for example a car. Although apparatus 300 is illustrated as a single device it is appreciated that, wherever applicable, functions of the apparatus 300 may be distributed to a plurality of devices, for example to implement example embodiments as a cloud computing service.

Example embodiments of the present disclosure disclose mechanisms for receiving/providing a wake-up signal for activating a device/apparatus. Means for these may be provided by the communication interface 308, as described above. The activation may involve activating the means for bidirectional communication of the device/apparatus. The activation may involve triggering, based on the WUS, by a WUS receiver. The activation may involve changing the device/apparatus, or the means for bidirectional communication thereof in particular, from inactive or idle mode to an active mode, such as the connected mode. Example embodiments of the present disclosure disclose mechanisms for providing a WUS indicating at least one candidate cell or carrier for a SCell and for determining, based on the WUS, at least one candidate cell or carrier for a SCell. Means for these may be provided by the at least one processor 302 and/or the at least one memory 304, as described above. Both UE-initiated and network-initiated, e.g. by a base station, procedures are disclosed.

The means for bidirectional communication 210 can be an (ordinary) NR transceiver. The WUS receiver 220 may solely be a receiver or it may also include a transmitter. The activation 240 of the means for bidirectional communication by the WUS receiver may be performed by any available means. The WUS receiver may be a low-power or an ultra-low power WUS receiver. With current technology, the WUS receiver may have an average power consumption below a microwatt, for example less than 10 nanowatts. Concurrently, RF sensitivity of −70/80 dBm may be achieved.

In typical deployments multiple frequency layers may be utilized. These may be in same or different frequency bands. Coverage may be provided with one frequency layer (for example at lower frequency band) and capacity extension may be enabled by at least one additional frequency layer through use of CA. In the inactive mode or the idle mode of the means for bidirectional communication, the UE may be 'camping' by coupling to a (single) frequency carrier. This carrier may be determined by reselection thresholds and priorities. In priority-based reselection mechanism, frequency carriers can have different priorities and UE may aim to camp on a carrier that has the highest priority. Further conditions for the carrier may include that it exceeds the minimum radio link level/quality thresholds. When the means for bidirectional communication has been activated, it can be operated in a connected mode (e.g. RRC_CONNECTED). In this mode multiple frequency carriers can be utilized via CA. This can allow increasing the user peak and cell edge throughput, as well as capacity. It may also allow load balancing flexibility.

As a part of IEEE 802.11ba, Wake-up Receiver (WuR) was introduced for various low power use cases. In the PHY layer design of WuR, the 20 MHz non-High Throughput (non-HT) preamble can be used for any WuR PHY Protocol Data Unit (PPDU), immediately followed by a 20 MHz OFDM symbol with Binary Phase Shift Keying (BPSK) modulation of 4 µs duration, the Synchronization (SYNC), and the Data fields. The non-HT preamble allows WuR frame transmissions to be detected by legacy IEEE 802.11a/g/n/ac station, as the 20 MHz non-HT preamble and the BPSK OFDM symbol combined result a 20 MHz WuR PPDU preamble. The remaining part of WuR PPDU, SYNC and Data fields can be narrowband, as the number of OFDM subcarriers employed is reduced to 13 subcarriers spaced 312.5 kHz each, i.e., SYNC and Data fields occupy 4 MHz of bandwidth instead of 20 MHz. This allows simpler, lower power receiver to be used while still supporting reasonable Signal to Interference and Noise Ratio (SINR).

Two rates can be supported: a higher rate of 250 kbps (i.e. 1 bit per legacy IEEE 802.11 symbol of 4 µs), and a lower rate of 62.5 kbps (for noisy environments to enhance robustness). SYNC field can be a narrowband preamble to support for synchronization, frame detection, and rate indication. Two different SYNC durations (64 µs or 128 µs) can be employed depending on the bit rate used in the Data field (i.e. 250 kbps or 62.5 kbps, respectively). SYNC field bit sequences are selected to achieve a reduced Frame Error Rate (FER). Multi-Carrier (MC)-OOK modulation with Manchester coding can be employed for the Data field symbols, which provides on and off periods for both one and zero bit values. Symbol duration can depend on the bit rate, and its structure on whether a one or a zero bit value is being transmitted. Thus, for 62.5 kbps, a 16 µs long symbol can be employed, with four differentiated sub-parts of 4 µs each alternating on and off periods, following a different schedule for transmissions of one and zero bits. For 250 kbps, symbol duration can be 4 µs with two sub-parts of 2 µs each, also alternating the on and off periods differently for transmissions of one and zero bits.

With introduction of WUS, such as LP-WUS, to idle and/or inactive UEs, it can also be expected that general UE measurement activity is reduced to enable the power saving benefit from the low-power receiver for WUS detection. Thus, the UE in such a state may be configured for performing only camping and monitoring the serving cell on which it is camping. The monitoring may be performed by infrequent intra-frequency measurements. On the other hand, the mobility measurements may be solely based on the WUS (e.g. beacon). In the idle and/or inactive mode, the UE may thus be configured for not be carrying out measurements of inter-frequency carriers. Early SCell activation enhancements might not be needed in a case, where there is not any measurements to be reported to determine the SCell candidates (cells or carriers). The activation or addition of viable SCells can thus be sped up. When the base station, e.g. gNB, does not need to configure the UE to acquire the measurements in the connected mode, a significant delay on the activation or addition of SCells can be omitted.

To preserve UE power consumption, SCell dormancy (dormant BWP) was introduced in Rel-16 of 3GPP to complement the SCell activation/de-activation. In SCell dormancy UE may be indicated via DCI (downlink control information) which SCells (group) are to be in 'active' (non-dormant) BWP (bandwidth part) and which cells in 'dormant' BWP. In dormant BWP the UE activity is expected to be reduced e.g. no PDCCH (physical downlink control channel) monitoring is assumed. Inside active (of C-DRX) time DCI format 1_1 and 0_1 can be used and outside active time (of C-DRX) DCI format 2_6 (DCP) can carry the indication field.

In Rel-16 Early Measurement Reporting (EMR) was introduced to accelerate proper SCell configuration in CA scenarios as well as using RRC (Radio Resource Control) resume to trigger 'restoring' stored MCGs(master cell groups)/SCGs(secondary cell groups). In EMR UE reports based on network request during the connection establishment the measurement result(s) acquired earlier. In (connection) resume, UE can also be configured to activate or add a set of SCells 'blindly' based on a priori configuration.

In accordance with the present disclosure, WUS such an LP-WUS, may be used for an IDLE/Inactive UE to enable power saving by reducing power consumption of paging monitoring. The WUS may be used to indicate to the UE the candidate cells/carriers to be considered for SCells. This may then trigger the UE to do measurement on those candidate cells/carriers during/prior connection establishment.

Based on the indication on WUS, UE can try to acquire and/or update measurement result(s) from indicated candidate cell(s) or carrier(s). The acquired measurement result(s) (or lack thereof) may be reported to the base station upon connection establishment (upon a request by the network, e.g. by the base station, or without any such request). UE may be preconfigured, in particular in connection release, with information indicating which cells or carriers the network, e.g. the base station, could effectively utilize to acquire measurement result(s) for SCell activation or addition. In some examples, the preconfiguration may be stored for a connection release between the UE and the base station. The preconfiguration may include mapping of the carrier/cell or group of carriers/cells to a specific WUS indication. The indication may be accompanied with a 'delay' parameter that allows the UE to delay the connection establishment to be able to carry out measurements on the indicated cells or carriers prior the connection establishment. The delay may also be implicitly defined based on the number of cells or carriers to be measurement or be always based on the maximum/largest possible measurement set. In alternative embodiment, preconfiguring the UE with cells or carriers to be measured prior connection establishment to be reported implicitly encompasses an allowed delay to the connection establishment. Additionally or alternatively WUS may be used to indicate if certain cells or carriers are to be activated or added as SCells. This may be done based on preconfigured information. The activation may be performed by L2/MAC. The addition may be performed by L3/RRC.

Figure 4:
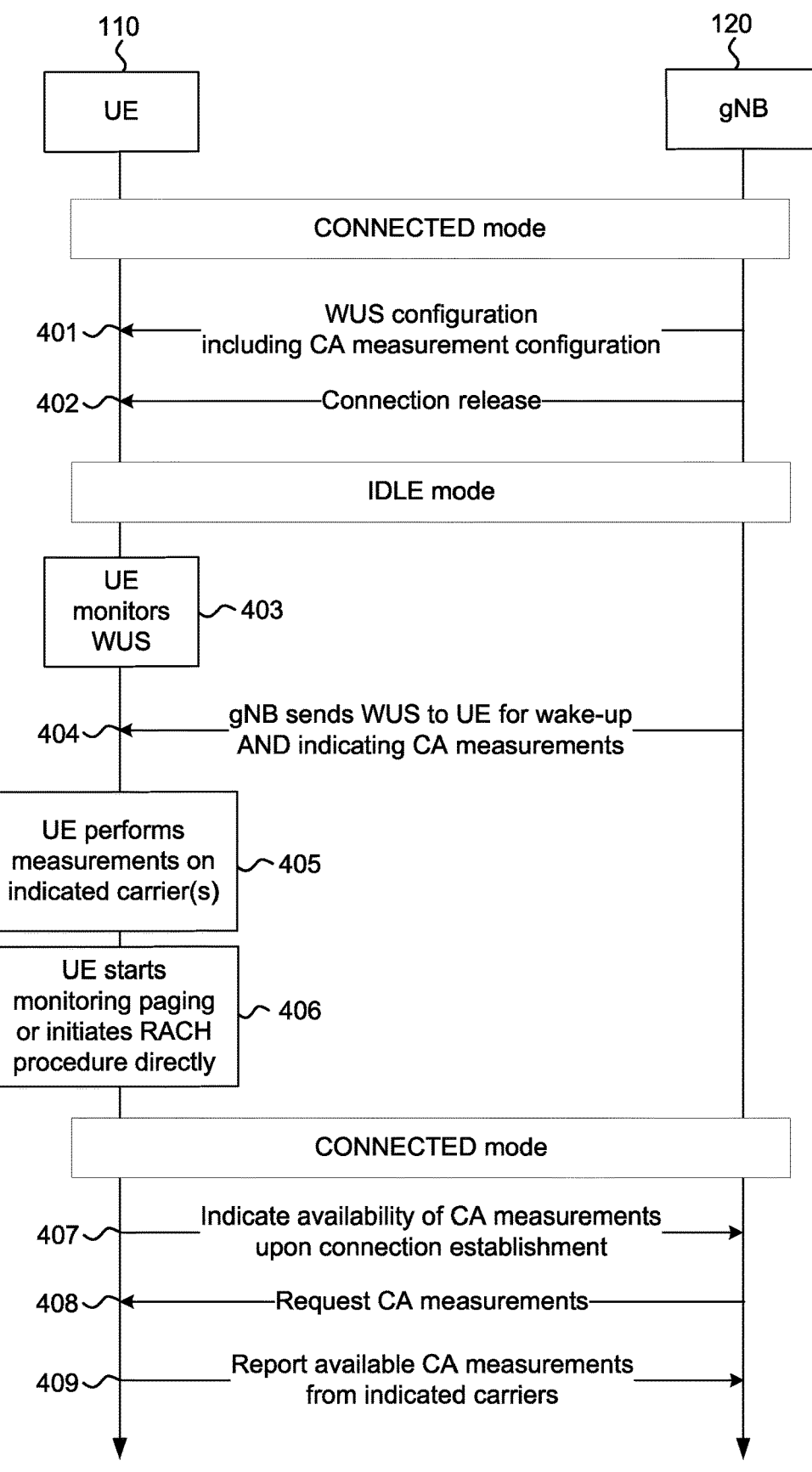
FIG. 4 illustrates an example of SCell preparation, according to an example embodiment.

FIG. 4 illustrates an example of SCell preparation. WUS, such as LP-WUS, may be used to indicate to the UE the candidate cells/carriers to be considered for SCells. An example of a signalling flow chart is presented.

An optional preconfiguration is illustrated in the connected mode (e.g. RRC_CONNECTED). A basic setup for the UE 110 may thus be initiated for the base station 120. The UE is configured 401 with a preconfiguration for determining candidate SCell(s) (cells or carriers) from a WUS. The preconfiguration may be provided from the base station. In case CA is supported for both the base station and the UE, CA configuration may be initiated. After the preconfiguration has been performed for the UE, the connection between the UE and the base station may be released 402.

IDLE or Inactive mode may be initiated for the UE to save power. The following may be performed in said mode, e.g. as IDLE operation in normal mode.

The UE may monitor 403 receipt of a WUS for activating the UE, in particular the means for bidirectional communication thereof. For this purpose, the UE may utilize a dedicated WUS receiver, which may be separate from the means for bidirectional communication. At this state, the UE may be configured for only monitoring the receipt of the WUS and, optionally, performing intra-frequency measurements for mobility. The base station may transmit 404 WUS to the UE for activating the UE, in particular the means for bidirectional communication thereof. In addition, the WUS is transmitted to indicate at least one candidate cell or carrier for a secondary cell (SCell) for communication between the means for bidirectional communication and the base station. The WUS may thus indicate at least one measurement, for example a carrier aggregation measurement, to be performed by the UE. A measurement request/trigger may be included in the WUS. This allows an early (CA) measurement.

The UE wakes up and initiates 405 measurement(s), such as CA measurement(s), on the at least one candidate cell or carrier. In some possible implementations, the WUS which indicates/triggers the measurement(s) may be sent earlier or allow/indicate an additional delay for connection establishment to carry out the measurement(s). The measurement(s) may also be performed, partially or fully, in parallel of the connection establishment between the UE and the base station. For this purpose, the UE may be CA capable and it may have sufficient (additional) RX chains to monitor the candidate SCells (cells or carriers).

After the measurement(s), the UE may 406 start monitoring paging or initiate RACH (random-access channel) procedure directly. After the RACH procedure, the UE may enter into connected mode with the network, in particular the base station. In the connected mode, the UE may send 407 an indication of the available measurement(s) to the base station. The indication may include any or all of the measurements or an indication that no measurements are available. The base station may also actively request 408 the measurement results(s) from the UE. Based on the request, or spontaneously as previously described, the UE may send 409 any or all of the available measurements to the base station.

FIG. 5 illustrates an example of a flow chart for SCell preparation. First, the UE may be provided 501 with a WUS preconfiguration, for example from the base station. The preconfiguration may include a configuration for candidate cells or carriers for an SCell, for example by mapping at least one WUS to at least one candidate SCell (cell or carrier).

In an idle or inactive mode, the UE receives 502 WUS, such as LP-WUS, indicating that the UE, in particular the means for bidirectional communication thereof, should move to a connected mode. The WUS also indicates the candidate cell(s) or carrier(s) for which measurement(s) such as CA measurement(s) may be performed. The WUS may be received by a dedicated WUS receiver of the UE.

The WUS may indicate a preference to acquire measurement(s) from at least one candidate cell or carrier. If so, the UE may determine 503 the need to perform at least one new measurement before connection establishment, for example based on preconfigured validity time for measurements. If there is need for at least one new measurement, the UE performs 504 the measurement(s). If not, the UE may utilize existing measurement(s).

Upon connection establishment, the UE may indicate 505 availability of measurement result(s) on any or all of the at least one candidate cell(s) or carrier(s) indicated by the WUS to the base station. Upon request from the base station, the UE may provide the measurement(s) or a report thereof to the base station. Alternatively, in connection establishment the UE may provide the measurement(s) or a report thereof to the base station based on the indication by the WUS and availability of the result(s), i.e., even without explicit request from the base station. Instructions for doing this may be preconfigured to the UE, for example in the preconfiguration as described above.

FIG. 6 illustrates an example of a method, which may be performed at a UE, according to an example embodiment. The method may be used for SCell preparation.

The method may comprise receiving 601, from a base station, a wake-up signal for activating an apparatus for bidirectional communication between the apparatus and the base station. The method may be performed at the apparatus. The apparatus may be the UE, for example in accordance with any of the examples described above. The wake-up signal may indicate at least one candidate cell or carrier for a secondary cell (SCell) for communication between the apparatus and the base station. The method may also comprise determining 602, based on the wake-up signal, at least one candidate cell or carrier for a secondary cell (SCell) for communication between the apparatus and the base station.

FIG. 7 illustrates an example of a method, which may be performed at a base station, according to an example embodiment. The method may be used for SCell preparation. The method may comprise providing 701 a wake-up signal for activating a device, the wake-up signal indicating at least one candidate cell or carrier for a secondary cell (SCell) for communication between the device and a base station. The method may also comprise transmitting 702 the wake-up signal to the device for activating the device for bidirectional communication between the device and the base station. The device may be the UE, for example in accordance with any of the examples described above.

With reference to both of the examples corresponding to FIG. 6 and FIG. 7, the activation may correspond to changing the mode of the apparatus, in particular for means for bidirectional communication thereof, into a connected mode (e.g. RRC_CONNECTED), for example from an idle (e.g. RRC_IDLE) or inactive mode (e.g. RRC_INACTIVE). Alternatively/additionally, the activation may also correspond to at least one of the following: monitoring of a downlink channel or monitoring of a downlink signal or transmitting of an uplink channel or transmitting of an uplink signal. Wherein the downlink channel might be a physical downlink control channel or a physical broadcast channel, the downlink signal might be a downlink reference signal or a synchronization signal, the uplink channel might be a physical uplink control channel, the uplink signal might be an uplink reference signal.

Further features of the methods directly result for example from the functionalities and parameters of the UE 110 or the base station 120, as described in the appended claims and throughout the specification, and are therefore not repeated here. Different variations of the methods may be also applied, as described in connection with the various example embodiments.

With reference to all examples described herein, in physical layer, the indication of the WUS for the candidate cell(s) or carrier(s) may be implemented via a sequence so that different indications may be implemented via different sequences. In one example implementation, the WUS (e.g. LP-WUS) sequence is an MC-OOK sequence. In the sequence, 'On' and 'Off' or a combination of 'On' and 'Off' symbols indicate binary values, e.g. '1' or '0'. Different sequences or combination of different symbol sequences (where symbols are combination of MC-OOK symbols) may be used to provide different indications. These different sequences may be defined as Hadamard matrices, e.g. as $H(2^{\wedge}k)$, where k is the length of the needed sequence, i.e. $\log 2(M)$, where M is the number of different indexes to be signalled. For example, $$H\!\left(2^1\right) = \begin{bmatrix} 1 & 1 \\ 1 & -1 \end{bmatrix}.$$

In general, $$H\!\left(2^k\right) = \begin{bmatrix} H\!\left(2^{k-1}\right) & H\!\left(2^{k-1}\right) \\ H\!\left(2^{k-1}\right) & -H\!\left(2^{k-1}\right) \end{bmatrix}$$

may be used. The solution allows maintaining the SCell activation delay reduction as introduced in Rel-16 of 3GPP with EMR, together with reduced measurement activity associated with WUS, or LP-WUS in particular.

The solutions as described herein may enable power saving operation with WUS, such as LP-WUS, without increasing a CA set-up delay by allowing UE to remain in WUS mode until connection establishment is done and measurements, such as CA measurements, requested.

An apparatus, for example the UE 110 or the base station 120, may be configured to perform or cause performance of any aspect of the methods described herein. Further, a computer program or a computer program product may comprise instructions for causing, when executed, an apparatus to perform any aspect of the methods described herein. Further, an apparatus may comprise means for performing any aspect of the method(s) described herein. According to an example embodiment, the means comprises at least one processor, and at least one memory storing instructions that, when executed by the at least one processor, cause performance of any aspect of the method(s).

The measurement(s) referred in the disclosure may be CA measurements or any other appropriate measurements. In particular, the measurement(s) may include mobility and/or load balancing measurement(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable):(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
at least one processor; and
at least one memory including code;
wherein the at least one memory and the code are configured to, with the at least one processor, cause the apparatus at least to:
receive, from a base station, a wake-up signal for activating bidirectional communication between the apparatus and the base station,
determine, based on the wake-up signal, at least one candidate cell or carrier for a secondary cell for communication between the apparatus and the base station, and
receive, from the base station in a connection release, a preconfiguration for the determining of the at least one candidate cell or carrier;
wherein the determining of the at least one candidate cell or carrier includes using the preconfiguration when the wake-up signal has been received; and
wherein the preconfiguration comprises information associated with a mapping of one or more cells or carriers to a wake-up signal.

2. The apparatus according to claim 1, wherein the apparatus is further caused to:
measure the at least one candidate cell or carrier before or during connection establishment between the apparatus and the base station.

3. The apparatus according to claim 2, wherein the apparatus is further caused to:
cause at least one indication of a result of the measurement to be transmitted to the base station upon the connection establishment.

4. The apparatus according to claim 2, wherein the apparatus is further caused to:
receive, from the base station, an indication of a delay and, based on the indication of the delay, delay the connection establishment between the apparatus and the base station for the measurement.

5. The apparatus according to claim 2, wherein the apparatus is further caused to:
determine a delay and, based on the delay, delay the connection establishment between the apparatus and the base station for the measurement.

6. The apparatus according to claim 5, wherein the determining of the delay is based on at least one of: a number of carriers or cells to be measured, or a maximum measurement set.

7. The apparatus according to claim 1, wherein the activating of bidirectional communication comprises at least one of: monitoring of a downlink channel, monitoring of a downlink signal, causing an uplink channel to be transmitted or causing an uplink signal to be transmitted.

8. The apparatus according to claim 1, wherein the apparatus is further caused to:

activate, based on the wake-up signal, one or more carriers as one or more secondary cells.

9. The apparatus according to claim 1, wherein the apparatus receives the wake-up signal with the apparatus being in an idle or inactive mode; and the apparatus receives the preconfiguration with the apparatus being in a connected mode.

10. The apparatus according to claim 1, wherein information includes a configuration for candidate cells or carriers by mapping at least one wake-up signal to at least one of the candidate cells or carriers.

11. The apparatus according to claim 1, wherein the wake-up signal is a low power wake-up signal.

12. An apparatus, comprising:

at least one processor; and at least one memory including code;

wherein the at least one memory and the code are configured to, with the at least one processor, cause the apparatus at least to:

provide a wake-up signal for activating a device, the wake-up signal indicating at least one candidate cell or carrier for a secondary cell for communication between the device and the apparatus, cause the wake-up signal to be transmitted to the device for activating the device for bidirectional communication between the device and the apparatus, and cause, in connection release, a preconfiguration to be transmitted to the device for use in determining, at the device and based on the wake-up signal, the at least one candidate cell or carrier; and wherein the preconfiguration comprises information associated with a mapping of one or more cells or carriers to a wake-up signal.

13. The apparatus according to claim 12, wherein the apparatus is further caused to:

receive at least one indication of a result of a measurement of the at least one candidate cell or carrier from the device upon connection establishment between the device and the apparatus.

14. The apparatus according to claim 13, wherein the apparatus is further caused to:

cause an indication of a delay to be transmitted, to the device, for delaying connection establishment between the device and the apparatus for the measurement.

15. The apparatus according to claim 12, wherein the apparatus is further caused to:

request, from the device, at least one result of a measurement upon connection establishment between the device and the apparatus.

16. The apparatus according to claim 12, wherein the activating the device comprises at least one of:

monitoring of a downlink channel, monitoring of a downlink signal, causing an uplink channel to be transmitted or causing an uplink signal to be transmitted.

17. A method comprising:

receiving, from a base station, a wake-up signal for activating a user equipment for bidirectional communication between the user equipment and the base station;

determining, based on the wake-up signal, at least one candidate cell or carrier for a secondary cell for communication between the user equipment and the base station; and receiving, from the base station in a connection release, a preconfiguration for the determining of the at least one candidate cell or carrier:

wherein the determining of the at least one candidate cell or carrier includes using the preconfiguration when the wake-up signal has been received; and wherein the preconfiguration comprises information associated with a mapping of one or more cells or carriers to a wake-up signal.

18. The method according to claim 17, further comprising:

measuring the at least one candidate cell or carrier before or during connection establishment between the apparatus and the base station.

19. The method according to claim 17, further comprising:

receiving, from the base station, an indication of a delay and, based on the indication of the delay, delay the connection establishment between the apparatus and the base station for the measurement.

20. A non-transitory computer readable medium comprising instructions that, when executed by an apparatus, cause the apparatus to perform the method as claimed in claim 17.

\* \* \* \* \*